(12) United States Patent
Negoi

(10) Patent No.: US 6,801,077 B2
(45) Date of Patent: Oct. 5, 2004

(54) PROGRAMMABLE CHARGE PUMP DEVICE

(75) Inventor: Andy Catalin Negoi, Adliswil (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/059,428

(22) Filed: Jan. 29, 2002

(65) Prior Publication Data

US 2002/0114199 A1 Aug. 22, 2002

(30) Foreign Application Priority Data

Feb. 1, 2001 (EP) .............................. 01102301

(51) Int. Cl.[7] .............................. G05F 1/10; G05F 3/02
(52) U.S. Cl. ...................................................... 327/536
(58) Field of Search .................................. 327/536, 537; 363/59–60

(56) References Cited

U.S. PATENT DOCUMENTS

| | | | | |
|---|---|---|---|---|
| 5,280,420 A | * | 1/1994 | Rapp ........................... | 363/60 |
| 6,052,295 A | * | 4/2000 | Buchschacher et al. ........ | 363/59 |
| 6,346,903 B1 | * | 2/2002 | Messager .................... | 341/154 |
| 6,452,438 B1 | * | 9/2002 | Li .............................. | 327/536 |
| 6,476,665 B2 | * | 11/2002 | Buchschacher ............. | 327/536 |

FOREIGN PATENT DOCUMENTS

EP 0319063 6/1989 ............ G11C/5/00

OTHER PUBLICATIONS

Patent Abstract of Japan, Publication No.: 2000262044, Publication Date: Sep. 22, 2000, Application Date: Mar. 9, 1999, Application No.: 11062299, Int.Cl.: H02M—3/07, Semiconductor Integrated Circuit Device.

* cited by examiner

*Primary Examiner*—Quan Tra
(74) *Attorney, Agent, or Firm*—Kevin Simons

(57) ABSTRACT

The invention relates to charge pump device and a display driver with a charge pump device. Further it relates to a display module with a display driver using a charge pump device and a telecom terminal having such a display module. To provide a device which needs a charge pump for generating a higher voltage as the supply voltage a charge pump device is proposed containing at least two stages (S), whereby a stage (S) comprises a switch ($SW_n$) and a charge device ($CS_n$) which are arranged to generate a voltage higher than the supply voltage ($V_{dd}$), whereby the stages (S) are arranged in serie and a required multiplication factor (MF) of the charge pump (CP) is adjustable by activating/deactivating a definable number of stages (S), whereby the switches ($SW_n$) of each stage ($S_n$) are arranged in the same way. Thereby it will achieved a freely programmable multiplication factor of the supply voltage and in the same time having switches in the charge pump which are optimized in the power consumption by programming a multiplication factor smaller than the maximum multiplication factor.

9 Claims, 3 Drawing Sheets

PROGRAMMABLE CHARGE PUMP DEVICE

The invention relates to charge pump device and a display driver with a charge pump device. Further it relates to a display module with a display driver using a charge pump device and a telecom terminal having such a display module.

Charge pump devices or voltage multipliers are used in devices, where a higher voltage than the supply voltages is necessary. These charge pump devices will be used especially in LCD modules and in flash memories, because the highest voltage required is larger than the voltage supply available. These parts are nowadays produced in large quantities and the current efficiency is a major issue. They are intended to be used in battery-operated applications, so low current consumption and recently low voltage become more and more important.

The LCD modules find a large application in cellular phones and other hand-held devices like organizers, laptops, PDAs, etc. In the phones, the supply voltage available for analog blocks is 2.8V and a LCD graphic display can be driven with voltages of 6 to 16V. The voltage needs to be multiplied to at least 3 times of the supply voltage. Because a display should be able to operate within a large range of the supply voltage, the multiplication factor should vary with the application.

A charge pump is composed by a cascade of several stages, whereby a stage contains at least a switch or a diode, a charge storing element, mostly realized as a capacitor and one driver. The driver commands the charge storing elements and is operated by periodical signals or phases. A charge stored in the first stage will be forwarded to the next stage, where it will be added to the charge of this stage, so a higher voltage will be generated, which is provided to the devices i.e. an LCD Module in a mobile phone.

There are two kinds of charge pumps:
with on-chip capacitors or
with external capacitors.

The on-chip capacitors driver is the simplest solution for Chip-On-Glass realizations and can offer a current efficiency of about 95%. The costs for the one-chip solution are lower. The charge pump with external capacitors is more efficient, but less suited to the Chip-On-Glass solutions because it is more expensive.

In order to change the multiplication factor of a charge pump to adapt the solution to different applications it would be possible to use not all stages of the charge pump to generate output voltages below the maximal possible voltages, where all stages of the charge pump are used. For example, one of the characteristics of the liquid crystal of the display is that it must be driven with a higher voltage at low temperatures, while the battery is only able to supply a low voltage. In this case, selecting a higher multiplication factor than at room temperature could improve the current consumption of the display module.

In the present case, even with not so low supply voltage $V_{dd}$, when not all the stages are used, it happens that one of the middle stages is used as the first switching stage, bringing a current efficiency loss.

So the charge pump is functional but it consumes more power than the optimum, because of the back current. To minimize the losses due to the back current, which is flowing from one stage to the stage before that stage towards the input of the charge pump device, while the switch in the looked stage is not yet completely open, the switches have been improved.

To solve the problem with the back current the switches of the first stage and the last stage of the charge pump are different from the middle switches.

In known applications, the charge pump has been designed including a mask change, with which the first used stage was transformed to increase efficiency, but forbidding further software changes of the multiplication factor. This solution is quite restrictive.

The EP 03190634 describes a voltage multiplier circuit comprising a serie of rectifier elements, which are alternately rendered conductive by alternatively applying complementary clock signals to capacitances which are connected to junction points of pairs of neighboring elements.

In a programmable charge pump, the multiplication factor is determined by how many stages are switching. The stages closer to the input, beginning with the first stage, are turned conductive to bring the supply voltage at the input of the first switching stage. The intermediate or middle stages are all of the type in FIG. 2, with bootstrap capacitor to increase the level of the command gate.

In a programmable charge pump, the first switching stage can though be any one of the stage.

By using that kind of stages or elements as a first stage of a voltage multiplier or a charge pump the input is constant (Vdd) and can not be switched as it would be a middle stage. In this case, the switch can not be turned ON if the supply voltage is lower than 2|Vtp| (Vtp is the threshold voltage of the PMOS).

As the supply voltage $V_{dd}$ becomes lower and lower, this problem arose. The switches used in nowadays charge pumps are built with PMOS transistors as switches of the stage. To improve the behavior of those switches, either bootstrap capacitors or level shifters are used to drive the gate of a PMOS switch. Bootstrap capacitor technique for all the middle and the last stage is used and recognized as a very efficient solution. But the switches can operate correctly only for a supply voltage $V_{dd}>2|V_{tp}|$, where $V_{tp}$ is the threshold voltage of a PMOS transistor. The limitation is in case a switch with bootstrap capacitor which is used as first stage and supplied between $V_{dd}$ and $V_{ss}$ permanently, whereby $V_{ss}$ is ground of the switch, assumed as 0V, but it can vary because of parasitic resistances. For lower supply voltage, the charge pump will not work. A $|V_{tp}|$ can be as high as 1.3V, varying with the process parameters and the temperature. Therefore, any $V_{dd}$ lower than 2.6V will cause a problem.

So it is an object of the invention to provide a device with a charge pump with a freely adjustable multiplication factor and minimized power losses.

The object will be solved with a charge pump device containing at least two stages, whereby a stage comprises a switch and a charge device which are arranged to generate a certain voltage higher than the supply voltage, whereby the stages are arranged in serie and a required multiplication factor of the charge pump is adjustable by activating/deactivating a certain number of stages and the switches of each stage are arranged in the same way.

The invention deals with that limitation of the low supply voltage and also constitutes a solution to efficiency loss when the multiplication factor is programmed lower than the maximum. The improvement concerns the switches with bootstrap capacitors. The new charge pump is functional beginning with $V_{dd}=|V_{tp}|$ and even programming a different multiplication factor than the number of stages N is not reducing the current efficiency.

An embodiment of a charge pump device according to that invention is characterized in that for a adjusting a multiplication factor smaller than the maximal possible factor the stages beginning from an input of the charge pump device will be deactivated. By this the possibility for using this charge pump for different application is assured, whereby due to the switching off of not needed stages no power loss appears.

So for applications where not the maximal multiplication factor is needed, the not used stages can be switched off without any the loss of power.

To achieve this the charge pump is composed of a cascade of switches, drivers and charge devices, realized as stage capacitors. Each switch SW of a stage comprises a switch MP1 which is arranged between an input IN and an output OUT of the stage (S) of the charge pump device, further two transistors MP2 and MP3 for controlling the isolated bulk of the switch MP1 and a fourth transistor MP4 to charge a boot capacitor ($C_B$), whereby the boot capacitor ($C_B$) is arranged for storing the charge to drive the gate of the switch MP1 further comprises a gate switch control unit GSU, whereby the gate switch control unit GSU is arranged to switch the gate of the switch MP1.

PMOS transistors have isolated bulk because they are built in a N-well area. By biasing this N-well area always to the highest potential the junction is reverse biased and isolates the PMOS transistor electrically from the substrate. The role of MP2 and MP3 is to determine which is the highest potential between the input and the output. All of the PMOS transistors of one switch are built in the same N-well area. In an embodiment of that invention the switch MP1 is preferably realized as isolated bulk transistor.

In an embodiment of that invention the charge pump device containing a level generation unit (LGU) for providing control signals for the gate switch control unit (GSU), whereby the gate switch control unit is foreseen to connect or disconnect the gate of the switch MP1 transistor from the $C_B$ capacitor.

In an preferred embodiment of the invention a charge pump device has a gate switch control unit, which is arranged to provide control signals to switch MP1 of the stage in case of voltages below $V_{dd}$.

By using the gate switch control unit GSU and the level generation unit LGU it is achieved to disconnect the bootstrap capacitor $C_b$ from the gate of MP1, when MP1 needs to be turned ON and driving directly with $V_{dd}$. When it needs to turn MP1 OFF, MN1 become OFF and MP5 is ON. The other two transistors MN2 and MP6 are to command correctly the gate of MP5. In the inventive solution the two transistors MN1 and MP5 located in the GSU are not conducting in the same time. MN1 is active when the switch MP1 has to be turned conductive: we apply 0V (alias<switchb>) to the gate of MP1 instead of the bottom plate of the bootstrap capacitor $C_b$ that can be |Vtp| in that moment and then it will be disconnected by the MP5, not conducting because its gate is to the selected highest potential.

So with that new architecture it is possible to realize the charge pump with switches having bootstrap capacitors in all stages and additionally the charge pump will be working at $V_{dd}=|V_{tp}|$.

Through it all stages can be build or realized in the same way, which leads to the results that by programming a multiplication factor lower than the maximal one, one of the middle stages of the charge pump can be used as first stage by avoiding the loss of power.

Further by using that kind of stages of a charge pump device it is possible to reprogram a multiplication factor after using a certain first multiplication factor.

The object will also be solved by a display driver for providing display information and voltages to a display unit with a charge pump device containing at least two stages, whereby a stage comprises a switch and a charge device which are arranged to generate a voltage higher than the supply voltage, whereby the stages are arranged in serie and all stages are realized in the same way and a required multiplication factor is adjustable by activating/deactivating a certain number of stages.

Further the object will be solved by an display module having display unit and a display driver with a charge pump device, containing at least two stages, whereby a stage comprises a switch and a charge device which are arranged to generate a voltage higher than the supply voltage, whereby the stages are arranged in serie and all stages are realized in the same way and a required multiplication factor is adjustable by activating/deactivating a certain number of stages.

The object will also be solved by an Telecom terminal having a display module (DM), a display unit (DU) and a display driver (DD) with a charge pump (CP) device, containing at least two stages (S), whereby a stage comprises a switch ($SW_n$) and a charge device ($CS_n$) which are arranged to generate a voltage higher than the supply voltage ($V_{dd}$), whereby the stages (S) are arranged in serie and all stages (S) are realized in the same way and a required multiplication factor (MF) is adjustable by activating/deactivating a certain number of stages (S).

In battery operated telecom terminals it is very important to have an LCD module with a minimized power consumption, due to a higher Standby or operating time.

The invention will be described in detail hereinafter with reference to a drawing; therein:

Figure 1:
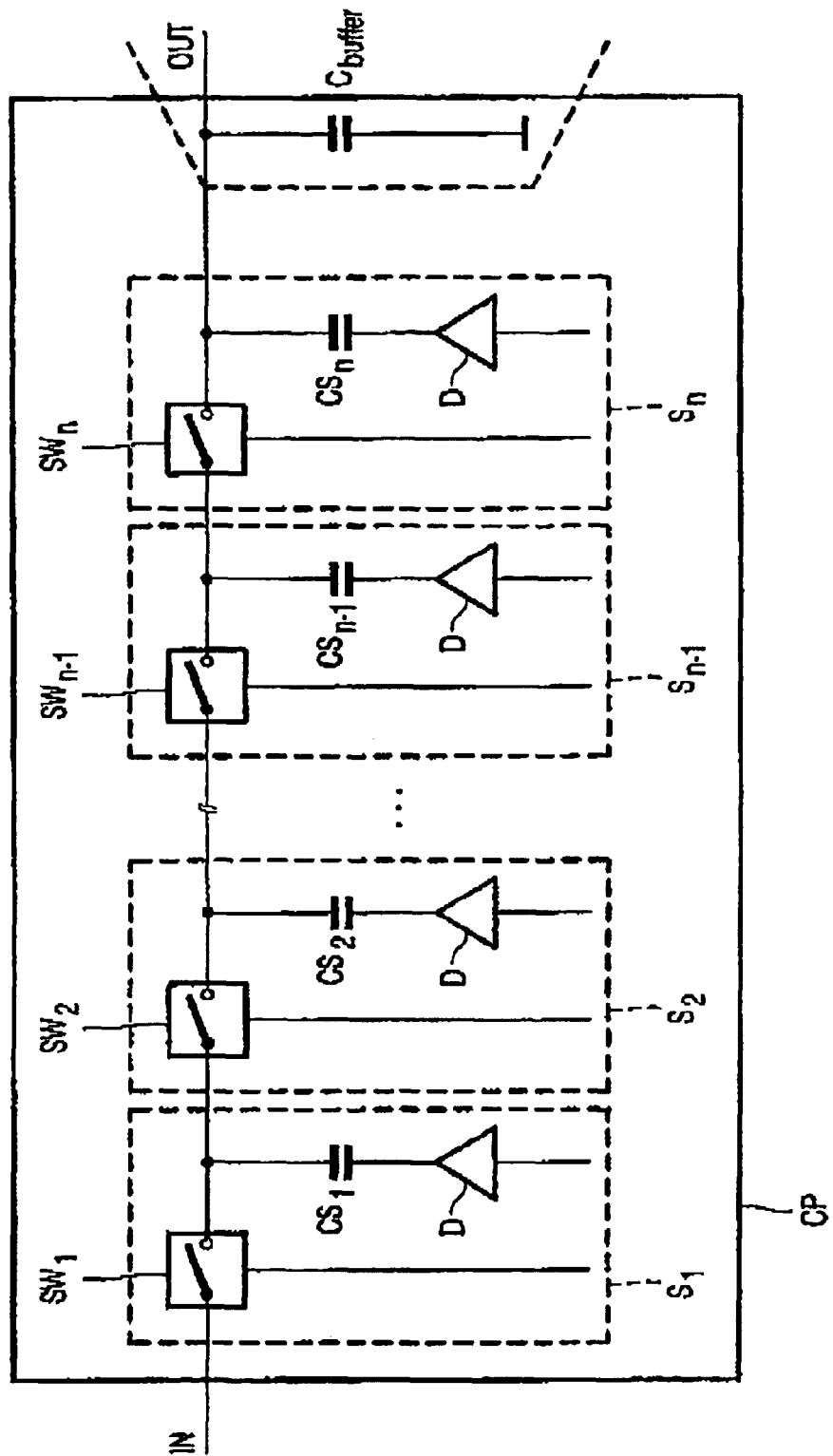
FIG. 1 shows an example of a conventional charge pump

FIG. 1 shows a schematic of a conventional charge pump CP. There are several stages $S_n$. A stage $S_n$ is composed of a switch $SW_n$ and charge storing element or device $CS_n$ and a driver D. The drivers D drive the charge storing elements $CS_1$–$CS_n$ alternatively in pairs according to a periodically signal. The $C_{Buffer}$ is not on the chip, due its size and is arranged to smooth out the output voltage. The supply voltage $V_{dd}$ is provided at the input IN of the charge pump CP. The higher voltage for providing i.e. a LCD module is generated at the Output OUT of the charge pump device CP.

The above described problem occurs when a switch $SW_n$ with bootstrap capacitor $C_B$ is used as the first stage, supplied at the input with $V_{dd}$. The FIG. 2 shows such a switch $SW_n$ used in a common charge pump CP.

The transistor MP1 is the main switching element of the switch $SW_n$, with two states: In the ON or closed state it lets the current flow form drain to source, in the OFF or open state, no current flows through. MP2 and MP3 form a voltage comparator. Their role is to bias the n-well area or the isolated bulk of the switch MP1 with the highest voltage, to avoid leakage due to forward biased diodes. $C_B$ is much smaller than the stage capacitor $CS_n$. Its role is to provide enough voltage to open the switch MP1 in one of the two phases of the pumping. The transistor MP4 plays a role in turning off the MP1 and in providing a DC path to charge the node switchbhv (bootstrap capacitor) when MP1 is OFF, from the stage capacitor $CS_n$.

Figure 2:
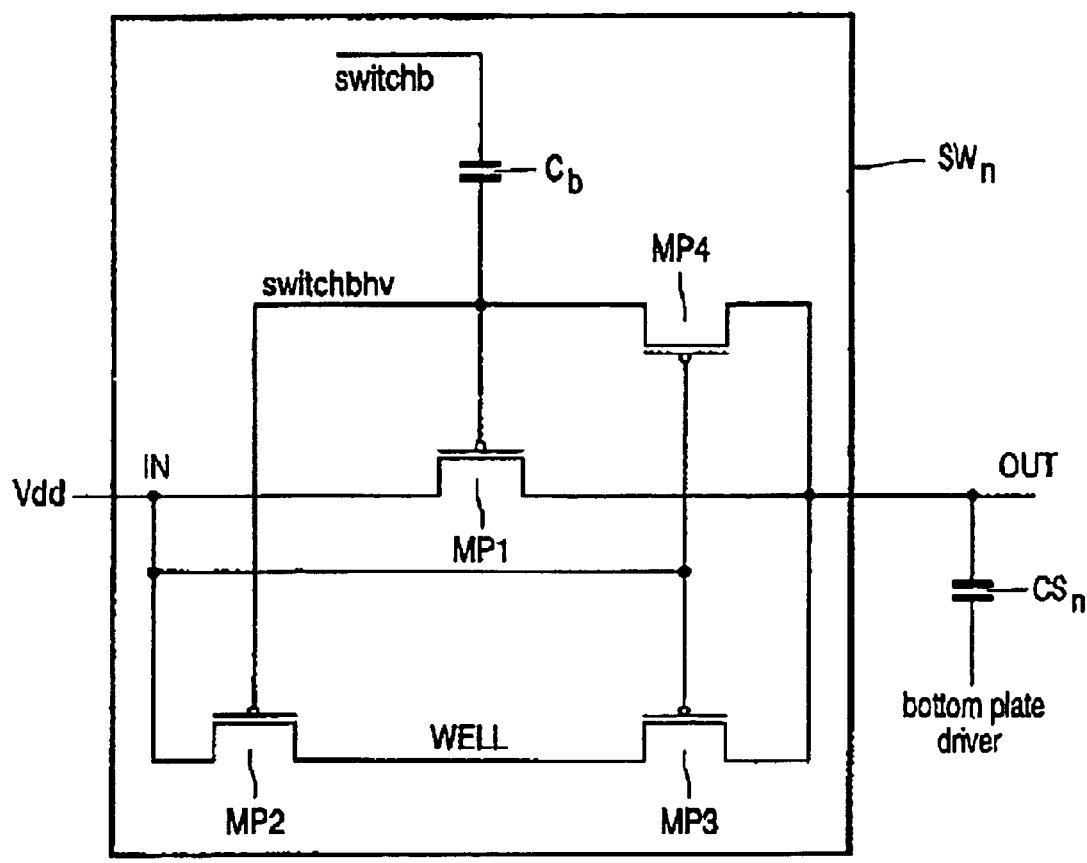
FIG. 2 shows a stage of a conventional charge pump

In the first phase the switch $SW_n$ as represented in the FIG. 2 is programmed as the first active switch $SW_1$ and is initially ON. $C_B$ is initially discharged. The input IN is set to the supply Voltage $V_{dd}$, the bottom plate of $CS_1$ to $V_{SS}$=0V and the Output OUT is charged to $V_{dd}$. MP1 and MP2 are ON, MP3 and MP4 are OFF, WELL=IN=$V_{dd}$. $C_B$ is discharged and switchbhv is isolated, switchb=0V so $C_B$ remains discharged and pulls switchbhv to 0V, keeping MP1 and MP2 ON.

In the next phase, the switch $SW_1$ needs to be turned off before the bottom plate of the $CS_1$ is driven to $V_{dd}$. The following events take place: IN=$V_{dd}$ (because it is the first stage). The node switchb is driven to $V_{dd}$. Because $C_B$ had no DC path and was not driven, the switchbhv node is pulled up by the bootstrap capacitor $C_B$. MP1 and MP2 are turned OFF. MP3 and MP4 remain also OFF. Then, the bottom plate of the stage capacitor $CS_1$ is driven from 0V to $V_{dd}$, and the next stage $S_2$ switch $SW_2$ is turned ON. The output node OUT will have $2V_{dd}$ and will discharge in the next stage capacitor $CS_2$. Because $V_{dd}$>$|V_{tp}|$, MP3 and MP4 will turn ON. Through them, the nodes WELL and switchbhv will have the same voltage as the output node OUT until the output OUT voltage drops to $V_{dd}$+$|V_{tp}|$. Then, MP3 and MP4 will turn OFF. At this point, the bootstrap capacitor $C_B$ is charged with $V_{dd}+|V_{tp}|-V_{dd}=|V_{tp}|$ (with switchbhv>switchb). MP1 and MP2 stay OFF because their gate voltage is higher than the drain and the source voltages. The output OUT can decrease under $V_{dd}$+$|V_{tp}|$ in two cases: at the beginning when all capacitors are discharged and when a large current is required at the output.

Following, the next stage $S_2$ switch $SW_2$ is turning off, the bottom plate of the stage capacitor $CS_2$ is again driven to 0V. The output node OUT is now lower than $|V_{tp}|$, IN=$V_{dd}$, switchb is tied to 0V. MP3 and MP4 continue to be OFF and we need to turn ON again MP1 and MP2. This is only possible when switchbhv<IN $-|V_{tp}|$. If this was NOT the first stage $S_1$, there would at the input IN 2 times $V_{dd}$ from the previous stage, so there will be no problem to meet the requirement. But as a first stage is IN=$V_{dd}$.

But $C_B$ was charged with $|V_{tp}|$ and that now the switchbhv node has no DC path to discharge this capacitor. The node switchb is 0V (it has to turned ON), so switchbhv is pulled down to $|V_{tp}|$.

Until now, the circuit worked because switchbhv=$|V_{tp}|$<IN$-|V_{tp}|$, so $V_{dd}$>$2|V_{tp}|$, which is the limit of this architecture.

To overcome this, the first stage $S_1$ must not have a bootstrap capacitor $C_B$, or this could be shorted with a mask change, so definitively only for the one application. Because $V_{dd}$=2.8V is not much larger than $2|V_{tp}|$=2.6V in the worst case, there is also a loss of efficiency.

New LCD drivers need to be operated from lower supply voltages than this limit of 2.6V, and for flexibility the maximum $V_{dd}$ could be as high as 4.5V. Programming the multiplication factor is a request for all new display drivers. Therefore, an architecture of the switches allowing lower input voltages is required. This invention is a solution to both the low $V_{dd}$ voltage and to the loss of efficiency in the same time.

Improved Architecture of the Middle Switches

Figure 3:
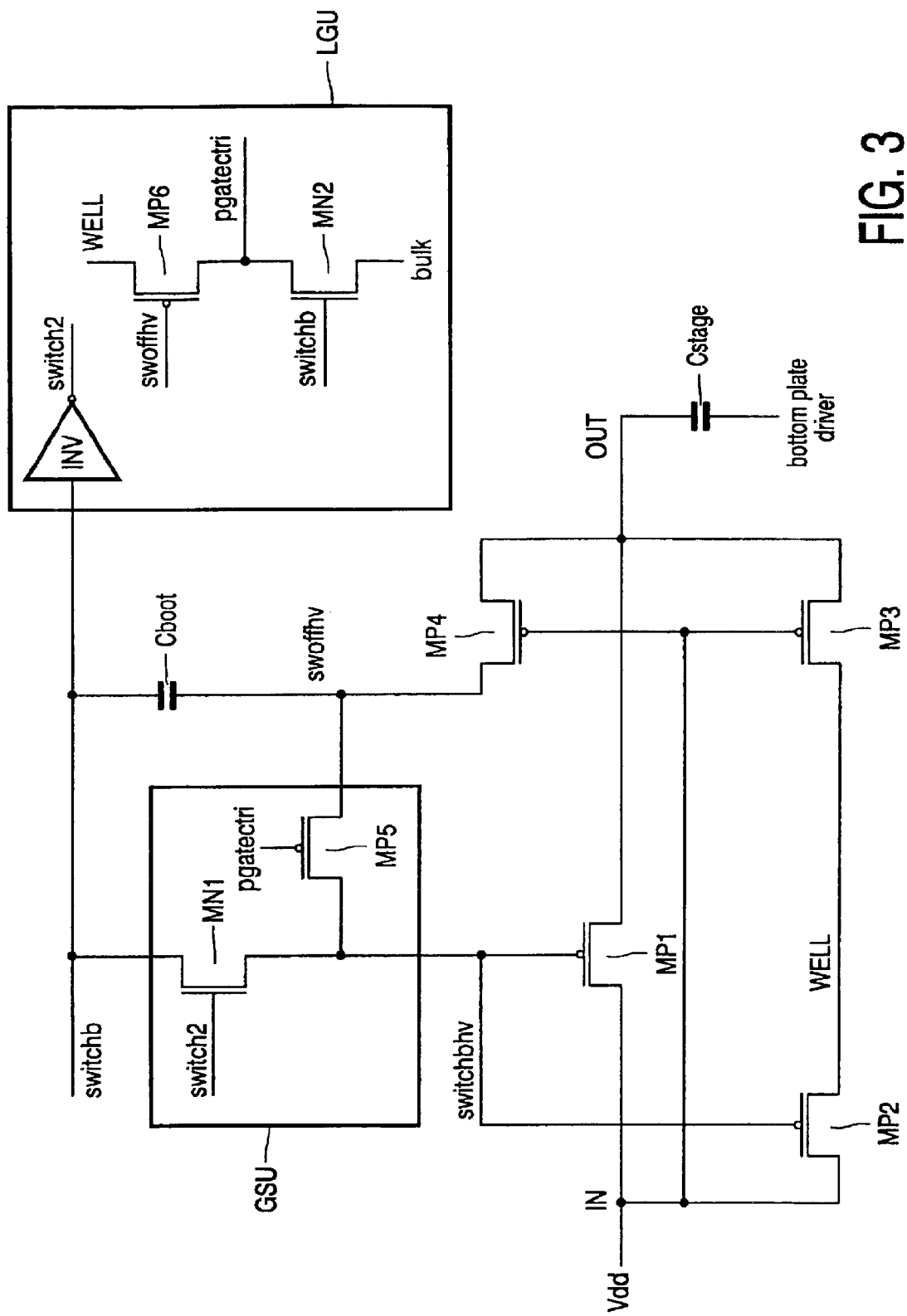
FIG. 3 shows a stage with gate switch control unit and level generation unit

In the FIG. 3, the new switch architecture with bootstrap capacitor is illustrated. A gate switch control unit GSU has been added and a level generation unit LGU. They are rather small in comparison with MP1 and MP4, and comparable in size with MP2 and MP3.

The GSU contains two transistors MN1 and MP5. The MN1 is arranged between the switchb and the switchbhv node, whereas the MP5 is located between swoffhv and the switchbhv. The LGU contains two transistors MP6 and MN2 to generate the signal pgatectrl. Additionally the LGU contains a inverter INV to generate the signal switch2 from the signal switchb.

The idea is: if it would possible to turn ON MP1 always with 0V and turn it OFF with a voltage always>$V_{dd}$+$|V_{tp}|$ in the other phase.

For turning ON the MP1, MN1 is active: switchb is 0V, switch2 is $V_{dd}$, so MN1 is ON and pulls the gates of MP1 and MP2 to 0V. For turning OFF, the node switchb comes to $V_{dd}$, switch2 to 0V so MN1 is OFF, MN2 is ON, WELL$-$swoffhv<$|V_{tp}|$ so that MP6 is OFF. This ties the node pgatectrl to 0V, turning ON the MP5. Consequently, the node switchbhv is disconnected from switchb and connected to swoffhv. As before, when MP1 is OFF, swoffhv is charged initially with 2Vdd and decrease because of the load downto as low as Vdd+$|$Vtp$|$.

In the next phase, the node switchb is driven to 0 to turn ON. This turns strongly MN2 OFF. The node OUT is lower than $|$Vtp$|$. The node swoffhv is now $|$Vtp$|$, and switch2 is $V_{dd}$. MN1 is therefore driven ON and switchbhv goes to 0V quickly. MP5 is still open in a certain measure: swoffhv= $|$Vtp$|$, pgatectrl is no more driven strongly to 0V but floating (WELL is equal to IN because MP2 switched ON). MP6 is in weak inversion, slightly conducting. It drives pgatectrl at the beginning weak towards WELL=IN=$V_{dd}$. In the same time $C_B$ is discharged towards 0V by MP5, still ON. Because of this discharge, and because initially swoffhv has $|$Vtp$|$, MP5 will turn off very quickly as pgatectrl is no more driven strongly to 0V, and from this moment $C_B$ does not loose any more charge. This solves the problem and the switch function in theory until $V_{dd}$ equals one $|V_{tp}|$.

When the new switch is not used as first active stage but as middle stage, i.e. as a second stage, the IN voltage is between $2V_{dd}$ and $|V_{tp}|$ (from the same considerations as before) and when the switch is ON, WELL is $2V_{dd}$, swoffhv is $V_{dd}$+$|V_{tp}|$, and discharges through MP5 until it reaches WELL$-|V_{tp}|$ (see MP6 which turns strongly ON), so from $V_{dd}$+$|V_{tp}|$ to $2V_{dd}$$-|V_{tp}|$. The amount of charge lost for $C_B$ (this is taken in the other phase from CS) per cycle is then $C_B*(V_{dd}+|V_{tp}|-2V_{dd}+|V_{tp}|)=C_B\,(2|V_{tp}|-V_{dd})$. If $V_{dd}$>$2|V_{tp}|$, no charge is lost, so the efficiency is not degraded.

Figure 4:
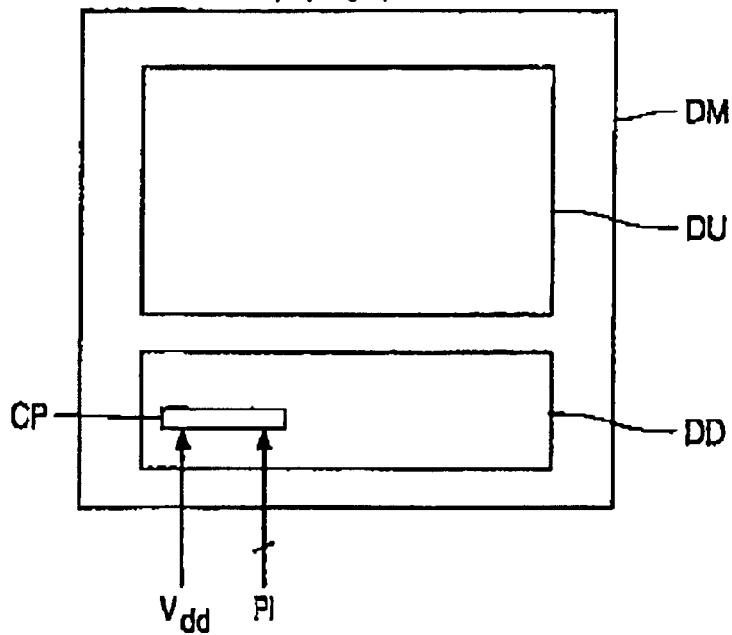
FIG. 4 shows a LCD Module with a Chip-On-Glass display driver

An application for low voltage operation of a voltage multiplier or a charge pump device for on-chip stage capacitors is shown in FIG. 4. The charge pump CP is a very important part of every LCD driver IC (DD), since the available supply voltage $V_{dd}$ is always lower than what is required to have good optical performance of the LCD module DM. The charge pump CP current efficiency is determining the low current consumption of the whole LCD module DM. In the FIG. 4 a LCD module DM with a Chip-On-Glass display driver (DD)-IC is depicted. The charge pump device CP is provided with the supply voltage Vdd. Additionally it is connected with a not shown Programming interface PI. By using the programming interface PI a multiplication factor MF can be chosen, which is small than then the maximal possible $MF_{max}$. This is achieved by deactivating several stages S. This solution allows to change the MF in dependency of the application, whereby the charge pump with the changed MF can be reprogrammed to an other MF without restrictions.

The LCD modules are important parts of every mobile phone and other hand-held devices. They are manufactured in large volumes. Another application could be flash memories, which also need operating voltages larger than the available supply. Flash memories are used for example in digital still cameras, as storage element, and low power and low voltage is also required.

What is claimed is:

1. Charge pump device containing at least two stages (S), whereby a stage (S) comprises a switch ($SW_n$) and a charge device ($CS_n$) which are arranged to generate a voltage higher than a supply voltage ($V_{dd}$), whereby the stages (S) are arranged in series and a required multiplication factor (MF) of the charge pump (CP) is adjustable by activating/deactivating a definable number of stages (S), whereby the switches ($SW_n$) of each stage ($S_n$) are arranged in the same way and comprise a switch MP1 which is arranged between an input (IN) and an output (OUT) of the stage (S), and the charge pump device further comprising:

two transistors MP2 and MP3 for controlling the isolated bulk of the switch ($SW_1$);

a forth transistor MP4 to charge a boot capacitor ($C_B$), whereby the boot capacitor ($C_B$) is arranged for storing the charge to drive the gate of the switch MP1; and a gate switch control unit comprising at least one transistor whereby the gate switch control unit (GSU) is arranged to control the gate of the switch MP1.

2. Charge pump device as claimed in claim 1, whereby for a multiplication factor (MF) smaller than the maximal possible multiplication factor ($MF_{max}$) the stages (S) beginning from an input (IN) of the charge pump (CP) device will be deactivated.

3. Charge pump device as claimed in claim 1, whereas the switch MP1 is preferably realized as isolated bulk transistor.

4. Charge pump device as claimed in claim 1, containing a level generation unit (LGU) for providing control signals for the gate switch control unit (GSU).

5. Charge pump device as claimed in claim 1, whereby the gate switch control unit (GSU) is foreseen to connect or disconnect the gate switch MP1 transistor from the $C_B$ capacitor.

6. Charge pump device as claimed in claim 1, whereby the gate switch control unit (GSU) is arranged to provide control signals to the switch (SW) of the stage (S) in case of voltages below $V_{dd}$.

7. Display driver (DD) for providing display information and voltages to a display unit (DU) with a charge pump (CP) device containing at least two stages (S), whereby a stage comprises a switch ($SW_n$) comprising a switch MP1 which is arranged between an input (IN) and an output (OUT) of the stage (S), a gate switch control unit comprising at least one transistor and a charge device ($CS_n$) which are arranged to generate a voltage higher than a supply voltage ($V_{dd}$), whereby the stages (S) are arranged in series and all stages (S) are realized in the same way and a required multiplication factor is adjustable by activating/deactivating a certain number of stages (S), the charge pump device further comprising:

two transistors MP2 and MP3 for controlling the isolated bulk of the switch ($SW_n$); and a forth transistor MP4 to charge a boot capacitor ($C_B$), whereby the boot capacitor ($C_B$) is arranged for storing the charge to drive the gate of the switch MP1; and wherein a gate switch control unit (GSU) is arranged to control the gate of the switch MP1.

8. Display module (DM) having a display unit (DU) and a display driver (DD) with a charge pump (CP) device, containing at least two stages (S), whereby a stage comprises a switch ($SW_n$) comprising a switch MP1 which is arranged between an input (IN) and an output (OUT) of the stage (S), a gate switch control unit comprising at least one transistor and a charge device ($CS_n$) which are arranged to generate a voltage higher than a supply voltage ($V_{dd}$), whereby the stages (S) are arranged in series and all stages (S) are realized in the same way and a required multiplication factor (MF) is adjustable by activating/deactivating a certain number of stages (S), the charge pump device further comprising:

two transistors MP2 and MP3 for controlling the isolated bulk of the switch ($SW_n$); and a forth transistor MP4 to charge a boot capacitor ($C_B$), whereby the boot capacitor ($C_B$) is arranged for storing the charge to drive the gate of the switch MP1; and wherein a gate switch control unit (GSU) is arranged to control the gate of the switch MP1.

9. Telcom terminal having a display module (DM), a display unit (DU) and a display driver (DD) with a charge pump (CP) device, containing at least two stages (S), whereby a stage comprises a switch ($SW_n$) comprising a switch MP1 which is arranged between an input (IN) and an output (OUT) of the stage (S), a gate switch control unit comprising at least one transistor and a charge device ($CS_n$) which are arranged to generate a voltage higher than a supply voltage ($V_{dd}$), whereby the stages (S) are arranged in series and all stages (S) are realized in the same way and a required multiplication factor (MF) is adjustable by activating/deactivating a certain number of stages (S), the charge pump device further comprising:

two transistor MP2 and MP3 for controlling the isolated bulk of the switch ($SW_n$); and a forth transistor MP4 to charge a boot capacitor ($C_B$), whereby the boot capacitor ($C_B$) is arranged for storing the charge to drive the gate of the switch MP1; and a gate switch control unit (GSU) is arranged to control the gate of the switch MP1.

* * * * *